(12) United States Patent
Sen

(10) Patent No.: US 9,851,842 B1
(45) Date of Patent: Dec. 26, 2017

(54) SYSTEMS AND METHODS FOR ADJUSTING DISPLAY CHARACTERISTICS

(71) Applicant: Rovi Guides, Inc., San Carlos, CA (US)

(72) Inventor: Susanto Sen, Bangalore (IN)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 15/233,602

(22) Filed: Aug. 10, 2016

(51) Int. Cl.
*G06F 3/041* (2006.01)

(52) U.S. Cl.
CPC .. *G06F 3/0416* (2013.01); *G06F 2203/04104* (2013.01); *G06F 2203/04105* (2013.01)

(58) Field of Classification Search
CPC ......... G06F 3/0416; G06F 2203/04105; G06F 2203/04104
See application file for complete search history.

(56) References Cited

U.S. PATENT DOCUMENTS

| | | | |
|---|---|---|---|
| 6,552,738 B1 | 4/2003 | Lin et al. | |
| 2004/0243940 A1 | 12/2004 | Lee et al. | |
| 2007/0146752 A1* | 6/2007 | Iguchi | H04N 1/00002 358/1.9 |
| 2009/0066680 A1* | 3/2009 | Rumreich | G09G 5/00 345/207 |
| 2013/0021488 A1* | 1/2013 | Plowman | H04N 19/56 348/222.1 |
| 2014/0237429 A1* | 8/2014 | Abrahami | G06T 11/001 715/835 |
| 2017/0245340 A1* | 8/2017 | Chen | H05B 37/0272 |

OTHER PUBLICATIONS

Buxton, B. (2010). Technology Insight Report—Multi-Touch Technology. *Patent iNSIGHT Pro.*
Han, J. Y. (2005). Low-cost multi-touch sensing through frustrated total internal reflection. *Proceedings of the 18th annual ACM symposium on User interface software and technology—UIST '05*, 115-118.

(Continued)

*Primary Examiner* — Ryan A Lubit
(74) *Attorney, Agent, or Firm* — Haley Guiliano LLP

(57) ABSTRACT

Systems and methods are described herein for adjusting display characteristics, such as brightness, contrast, sharpness, color balance, and gamma correction. A media guidance application may generate for display on a touch screen multiple indicators corresponding to a plurality of display characteristics. The media guidance application may detect a first contact point on the touch screen and a second contact point while the first contact point remains in contact with the touch screen. In response to detecting the first and second contact points, the media guidance application may retrieve a mapping for display characteristics that associate each of the contact points with one of the plurality of display characteristics based on certain criteria. The user may manipulate each contact point individually to change the display characteristics simultaneously and achieve the desired combination of display characteristics.

20 Claims, 8 Drawing Sheets

(56) References Cited

OTHER PUBLICATIONS

Kammer, D., Wojdziak, J., Keck, M., Groh, R., & Taranko, S. (2010). Towards a Formalization of Multi-touch Gestures. *ACM International Conference on Interactive Tabletops and Surfaces*, 3/94, 49-58.

Müller, S., Würsch, M., Schöni, P., Ghezzi, G., Giger, E., & Gall, H. C. (2012). Tangible software modeling with multi-touch technology. 2012 5th International Workshop on Co-operative and Human Aspects of Software Engineering, CHASE 2012—Proceedings (pp. 100-104).

R. Chang, F. Wang and P. You, "A Survey on the Development of Multi-touch Technology," *Wearable Computing Systems (APWCS)*, 2010 *Asia-Pacific Conference on*, Shenzhen, 2010, pp. 363-366. doi: 10.1109/APWCS.2010.99 URL: <http://ieeexplore.ieee.org/stamp/stamp.jsp?tp=&arnumber=5481213&isnumber=5480270>.

Schöning, J., Brandl, P., Daiber, F., Echtler, F., Hilliges, O., Hook, J., Löchtefeld, M., et al. (2008). Multi-Touch Surfaces: A Technical Guide. *Technical Report TUMI0833, Technical Reports of the Technical University of Munich*.

Schöning, J., Hook, J., Bartindale, T., Schmidt, D., Oliver, P., Echtler, F., Motamedi, N., et al. (2010). Bulding Interactive Multi-touch Surfaces. *Tabletops—Horizontal Interactive Displays* (vol. 14, pp. 35-55).

\* cited by examiner

800

801 Initialization Subroutine
802 ...
803 //Routine to adjust screen characteristics
804 Generate for display on touch screen a first axis corresponding to first display characteristic
805 Retrieve A = current value of first display characteristic
806 Generate for display a first indicator on the first axis at (x1, y1) based on A
807 Generate for display on touch screen a second axis corresponding to second display characteristic
808 Retrieve B = current value of second display characteristic
809 Generate for display a second indicator on the second axis at (x2, y2) based on B
810 Detect a first contact point on the touch screen
811 Select database listing display characteristic mappings for single contact point
812 Detect a second contact point on the touch screen within threshold time
813 Select database listing display characteristic mappings for multiple contact points
814 Access a mapping that associates first contact point with first display characteristic and second contact point with second display characteristic
815 Retrieve coordinates (x3, y3) for first contact point
816 Retrieve coordinates (x4, y4) for second contact point
817 Calculate first distance based on (x1, y1) and (x3, y3)
818 Calculate second distance based on (x2, y2) and (x4, y4)
819 Calculate new position of first indicator (x1', y1') based on first distance
820 Calculate new position of second indicator (x2', y2') based on second distance
821 Generate for display the first and second indicator at new positions
822 ...
823 Termination Subroutine
824 ...

FIG. 8

SYSTEMS AND METHODS FOR ADJUSTING DISPLAY CHARACTERISTICS

BACKGROUND

Typical electronic displays such as televisions and computer monitors allow a user to manually adjust one of several screen characteristics, such as brightness, sharpness, contrast, and color. The adjustment is typically performed through a user interface utilizing an input device such as a keyboard, controller, console, or touch screen. However, conventional interfaces for adjusting screen characteristics only allow one screen characteristic to be changed at a time. Not only is this adjustment process time consuming, because the user must individually select and change each desired screen characteristic, but the user is unable to efficiently change combinations of screen characteristics to achieve the desired effect. For example, a typical monitor adjustment procedure involves (1) turning contrast to the minimum value to display a black picture; (2) adjusting the brightness control to reproduce the desired shade of black; and (3) adjusting the contrast control up to achieve the desired brightness level. Adjustment procedures which require changing combinations of screen characteristics may be more efficiently performed by providing the user with an interface that is able to change two or more screen characteristics simultaneously.

SUMMARY

Accordingly, systems and methods are described herein for adjusting screen characteristics, and more specifically, for allowing a user to change multiple screen characteristics simultaneously. It will be understood by those of skill in the art that the terms "screen," "display," and "monitor" are used interchangeably and all refer to a device which utilizes electricity to create an image or video for viewing by a user. As used herein, the term "screen characteristic" refers to any attribute of a screen which may be changed to affect the appearance of a generated image or video on the screen. For example, screen characteristics may include brightness, color or color balance, sharpness, contrast, or gamma correction, among others, as will be understood by those of skill in the art.

As used herein, the term "brightness" refers to a screen characteristic that represents the light output that a screen appears to be radiating. In this manner, brightness is a measure of luminescence of a screen, irrespective of hue or saturation. As used herein, "contrast" refers to a screen characteristic that represents the ratio of luminance of the brightest color (i.e., white) to that of the darkest color (i.e., black) that the screen produces. As used herein, "sharpness" refers to a screen characteristic that represents a degree to which a screen emphasizes boundaries between dark and light areas. As used herein, "color" or "color balance" refers to a screen characteristic that represents a measure or ratio of intensities of the colors (such as red, green, and blue). It will be understood by those of skill in the art that these screen characteristics are provided for illustrative purposes only, and that other screen characteristics, such as gamma correction, may be utilized by the systems and methods described herein. Furthermore, although each of the screen characteristics are described herein in relation to a 0-100 numeric scale, it will be understood that this is provided for illustrative purposes only, and that other scales, including those based on alpha-numeric or symbolic scales are contemplated and may be used with the systems and methods described herein.

As used herein, a "touch," "touch event," or "tap" refers to a user input on a touch screen in which the user comes into contact with the touch screen at a single point. As used herein, a "swipe" or "swipe event" refers to a user input in which the user contacts the touch screen and moves from a first point on the touch screen to a second point on the touch screen while maintaining contact with the touch screen between the first point and the second point.

The system and methods described herein may allow a user to change two or more screen characteristics simultaneously. A media guidance application may generate for display indicators corresponding to the two or more screen characteristics. These various display indicators may be graphically represented in any suitable manner, including via bar graph, pie chart, line graph, etc. The display indicators may also have marker(s) that indicate a current setting or value for the respective display characteristic. For instance, in an embodiment where the display indicator is a bar graph, the display indicator may place a visual marker at a point corresponding to the current setting for the display characteristic. In some embodiments, the display characteristic may range in value over a particular scale, such as 0 to 10 or 0 to 100. In such embodiments, the display indicator may also indicate the current numerical value for the display characteristic.

In some embodiments, indicators for multiple screen characteristics, such as brightness, sharpness, contrast, and color, may be displayed simultaneously on a screen. In some embodiments, these characteristics may be arranged as line graphs on axes (e.g., +x, −x, +y, −y) of a Cartesian coordinate plane. The user may be able to change any one of the displayed screen characteristics using conventional adjustment interfaces. For example, a user input device (e.g., keyboard, mouse, touchpad, touch screen, console, directional pad, etc.) may be used to control an on-screen cursor and select and adjust one of the displayed screen characteristics. In some embodiments, each of the displayed screen characteristics may be controlled by a respective, separate button on a user input device. By manipulating separate buttons, the user may simultaneously adjust the displayed screen characteristics at the same time. It will be understood that the features of the systems and methods are described herein with respect to four display characteristics, but that any suitable number and display arrangement for the screen characteristics may be utilized.

In some embodiments, the displayed screen characteristics may be controlled by a touch screen. For example, touching any one of the four axes on a displayed Cartesian coordinate system may result in changing a respective one of the displayed four screen characteristics to a setting corresponding to the location on the axes that the user touched. In some embodiments, a user may adjust two screen characteristics simultaneously by touching one of the four quadrants on the Cartesian coordinate system. As an illustrative example, the user may touch a location in quadrant I (upper right quadrant corresponding to +x, +y) of the Cartesian coordinate system. The x-coordinate of the touched location may change a first display characteristic to a value corresponding to the x-coordinate, and the y-coordinate of the touched location may change a second display characteristic to a value corresponding to the y-coordinate. The media guidance application may generate for display a point to represent the touched location and/or lines connecting the point to the x and y axes of the coordinate plane. If the user drags his/her finger across the screen, the media guidance application may detect changes to the (x,y) coordinates in real-time and change the corresponding display characteristics accordingly in real-time.

In some embodiments, the media guidance application may respond to multi-touch input to change the various display characteristics. For instance, the user may place two, three, four, or more fingers onto a touch screen at the same time, and each touch point may control a respective screen characteristic. In this way, the user may simultaneously change multiple screen characteristics by moving each finger in a desired direction. In such embodiments, the media guidance application may assign screen characteristics to each detected touch point by the user. The assignment may be performed in several ways. For example, in the case of two simultaneous touch points in the same quadrant, the two screen characteristics corresponding to the two closest Cartesian axes may be assigned to the two touch points, in either a predetermined or random order.

In some embodiments, the media guidance application may assign screen characteristics to touch points in a particular order from the left-most touch point to the right-most touch point. For example, the media guidance application may extract the x-coordinate for each detected touch point and use the extracted x-coordinate to order the touch points from left-most to right-most. The media guidance application may then assign the screen characteristics in a particular order, starting with the left-most touch point and finishing with the right-most touch point.

In some embodiments, the media guidance application may detect a touch pressure associated with each touch point and assign screen characteristics to the touch points based on the detected touch pressure. For example, the touch point associated with the highest touch pressure may always be assigned to brightness, while the touch point associated with the lightest touch pressure may always be assigned to contrast. It will be understood by those of ordinary skill in the art that other arrangements and methods of assigning screen characteristics to touch points based on touch pressure are contemplated herein.

According to some aspects, a media guidance application may perform a method for adjusting screen characteristics. The media guidance application may generate for display on a touch screen a first axis corresponding to a first display characteristic and a first indicator that indicates a current value of the first display characteristic. As discussed above, the first axis may be an axis on a Cartesian coordinate plane. The media guidance application may further generate for display on the touch screen, concurrently with the first axis and the first indicator, a second axis corresponding to a second display characteristic and a second indicator that indicates a current value of the second display characteristic. The media guidance application may generate for display the first and second axis and the first and second indicators as part of a display characteristic adjustment screen. The display characteristic adjustment screen may be accessed by a user upon user request. For example, the user may navigate a media guidance menu using a user input device and select an option to adjust display characteristics.

The media guidance application may detect a first contact point on the touch screen, and in response to detecting the first contact point, select a database listing display characteristic mappings that are triggered in response to a detection of a single contact point. The database may comprise any suitable database for storing the display characteristic mappings and may be stored in any suitable location, including locally on a user device or remotely at a remote storage location (such as a cloud storage device). The display characteristic mappings may comprise data that indicates a correlation between a user input and a display characteristic. As an illustrative example, it may comprise data that causes the media guidance application to adjust a display characteristic in response to a certain button press on a user input device. As another example, the mapping may comprise data that causes the media guidance application to adjust a display characteristic in response to a single touch press or swipe event on a touch screen. In some embodiments, the mapping may comprise data for multi-touch operations. For example, the mapping may comprise data that causes the media guidance application to distinguish between multiple simultaneous touch or swipe events and assign a first contact point or swipe event to adjust a first display characteristic and a second contact point or swipe event to adjust a second display characteristic. As an illustrative example, a user may touch a touch screen with the tips of two fingers. The media guidance application may access a mapping of display characteristics which indicates that, in the case of two touch points, the left-most touch point is to be assigned to controlling brightness and the right-most touch point is to be assigned to controlling contrast. The media guidance may assign the touch points to the display characteristics according to the mapping.

The media guidance application may detect a second contact point on the touch screen while the first contact point remains in contact with the touch screen for a threshold time period. In response to detecting the second contact point on the touch screen while the first contact point remains in contact with the touch screen, the media guidance application may select a database listing mappings for display characteristic mappings that are triggered in response to a detection of multiple contact points. These mappings may distinguish between multiple touch or swipe events in any suitable manner. For example, in some embodiments, the media guidance application may determine a distance between the first contact point and the second contact point on the touchscreen, and the mapping may assign the contact points to display characteristics based on the distance between the first contact point and the second contact point on the touchscreen. In some embodiments, the media guidance application may determine a pressure differential between a pressure at the first contact point and a pressure at the second contact point on the touchscreen, and the mapping may assign the contact points to the display characteristics based on the pressure differential. In some embodiments, the media guidance application may determine a length of time of contact at the first contact point and a length of time of contact at the second contact point on the touchscreen, and the mapping may assign the contact points to the display characteristics based on the length of time of contact at the first contact point and the length of time of contact at the second contact point. In some embodiments, the media guidance application may determine a difference in a surface area of contact at the first contact point and a surface area of contact at the second contact point on the touchscreen, and the mapping may assign the contact points to the display characteristics based on the difference in the surface area of contact at the first contact point and the surface area of contact at the second contact point on the touchscreen.

The media guidance application may select from the database listing mappings for display characteristic mappings that are triggered in response to the detection of multiple contact points, a mapping, which causes control circuitry to associate the first contact point with the first display characteristic and the second contact point with the second display characteristic. In some embodiments, the database listing mappings that are triggered in response to the detection of a single contact point and the database listing mappings that are triggered in response to the detection of multiple contact points may be each part of a larger database, or they may be maintained as separate databases. By maintaining multiple databases for mappings triggered by a single contact point and mappings triggered by multiple contact points, the media guidance application is able to respond specifically to different touch events, such as taps, touches, swipes, as well as multi-touch gestures, such as pinches, expand gestures, or multi-point taps, touches, or swipes. The media guidance application is able to select a mapping corresponding to a particular touch event or events and, based on the mapping, assign a display characteristic to each touch event. In this manner, the media guidance application is able to detect simultaneous touch events and solve the problem of simultaneously changing display characteristics, thereby improving the user interface for adjusting these display characteristics.

As an illustrative example, the database listing mappings that are triggered in response to a single contact point or multiple contact points may comprise entries or fields that list a specific touch event or characteristic of a touch event as well as a corresponding display characteristic or indication of a display characteristic. For example, the database may include a field for one or more of the following: a surface area of a touch event(s), a pressure of a touch event(s), a position(s) of a touch event(s), or a relative location of a touch event(s) in relation to another displayed item, such as axes for a display characteristic. The database may also include a corresponding field that lists a particular display characteristic, an indication of a display characteristics, or a method for calculating a display characteristic. As an illustrative example, the database may indicate that a contact point on the touch screen that exceeds a threshold pressure is assigned to controlling "brightness," and any upward or downward swipe motion of the contact point may correspond to an upward or downward adjustment of brightness. As another illustrative example, the database may indicate that in the event that two contact points are simultaneously displayed, then the contact point nearest to the "contrast" axis is assigned to controlling contrast, and the contact point nearest the "color" axis (or the remaining contact point) is assigned to controlling "color."

The media guidance application may calculate, using control circuitry, a first distance based on the first contact point and a position of the first indicator and a second distance based on the second contact point and a position of the second indicator. Based on the calculated distances based on the contact points, the media guidance application may simultaneously change the first indicator and the second indicator. For example, the media guidance application may calculate a first distance between the first contact point and the first axis and a second distance between the second contact point and the second axis. The media guidance application may determine, based on the calculated first distance and the calculated second distance, that the first contact point is closer to the first axis than the second contact point. In such embodiments, the mapping may cause control circuitry to associate the first contact point with the first display characteristic and the second contact point with the second display characteristic based on the determination that the first contact point is closer to the first axis than the second contact point.

In some embodiments, the media guidance application may extrapolate a line between the first contact point and the first axis and determine an intersection point between the extrapolated line and the first axis. The media guidance application may then calculate a distance between the intersection point and the position of the first indicator in order to determine an amount to adjust the first display characteristic. The media guidance application may perform a similar series of steps to adjust the second display characteristic.

In some embodiments, the first contact point may be on the first axis, and the second contact point may be on the second axis. For example, the user may simultaneously touch a point on both axes in order to simultaneously change two display characteristics at the same time.

In some embodiments, the first axis and second axis may be generated for display on the touch screen by overlaying the first axis and the second axis on a media asset. In some embodiments, the media asset may be played back or paused in the background while the first and second axes are generated for display.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 8 depicts illustrative pseudocode for adjusting screen characteristics in accordance with some embodiments of the disclosure;

DETAILED DESCRIPTION OF THE DRAWINGS

Figure 1:
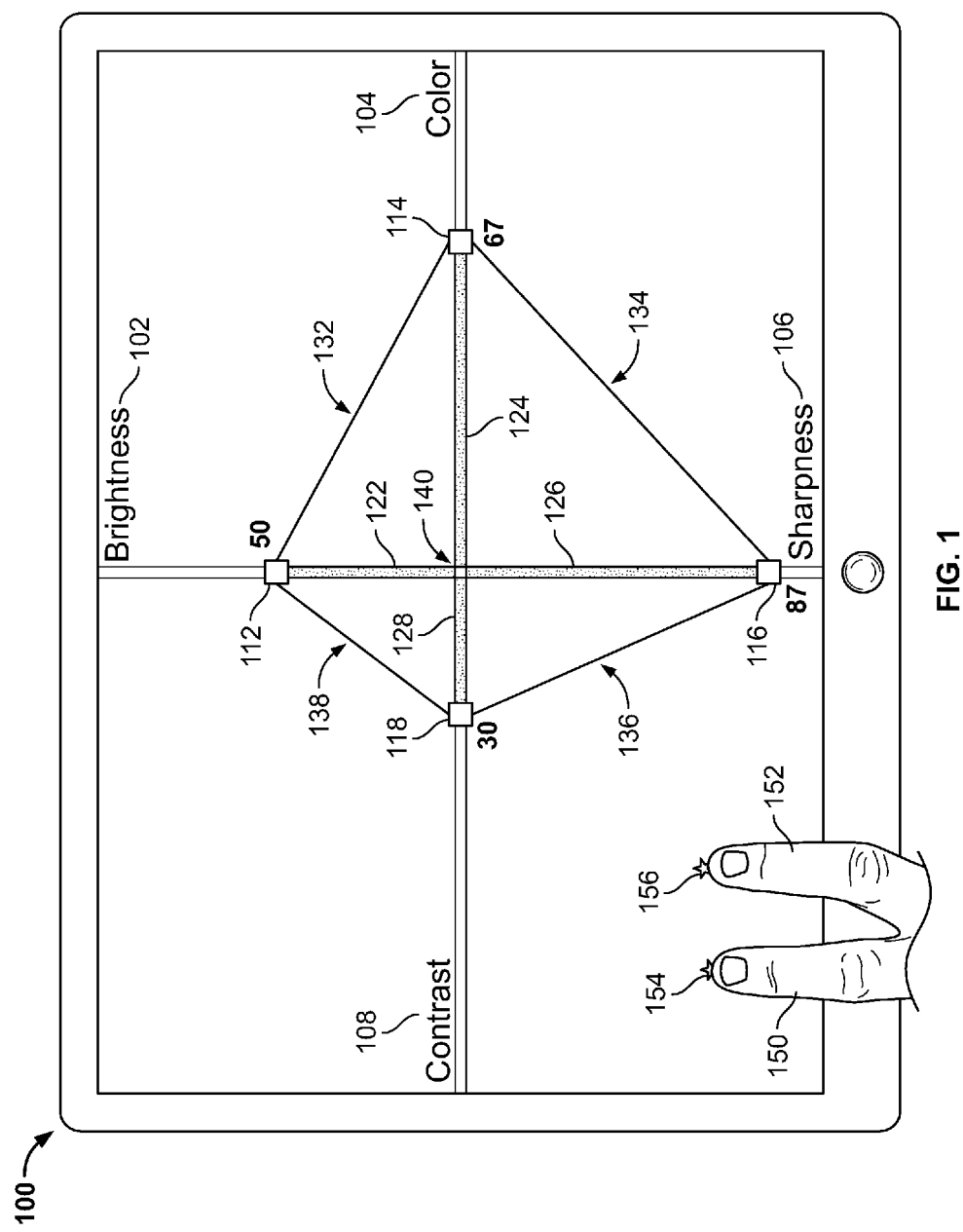
FIG. 1 shows an illustrative display screen for adjusting screen characteristics in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

FIG. 1 shows an illustrative display screen 100 for adjusting screen characteristics in accordance with some embodiments of the disclosure. Display screen 100 includes display characteristic axes 102-108, display characteristic markers 112-118, display characteristic value bars 122-128, connector lines 132-138, origin 140, and contact points 154 and 156. Fingers 150 and 152 are shown for illustrative purposes only. It will be understood that the media recommendation screen 100 is provided for illustrative purposes only, that certain elements may be added or omitted, and that other configurations or combinations of elements may be contemplated as will be understood by those of skill in the art.

In the illustrative example depicted in FIG. 1, a media asset is playing in the background while the display characteristic axes 102-108 are overlayed on top of the media asset. In this illustrative example, the display characteristic axes 102-108 comprise the four axes (+x, +y, −x, −y) of a Cartesian coordinate plane, with each axis corresponding to a single display characteristic. The value of each respective display characteristic is depicted as a numerical value between 0 and 100, and the current value of each respective display characteristic is indicated by a combination of the display characteristic markers 112-118 and display characteristic value bars 122-128. The display characteristic markers 112-118 are depicted as boxes, but it will be understood that any symbol or indicator may be utilized to indicate a position on the display characteristic axes 102-108. Furthermore, the illustrative example depicted in FIG. 1 depicts the current value of the respective display characteristic as a number beside the display characteristic marker 112-118. It will be understood that the display characteristic markers, numbers, and display characteristic bars 122-128 are provided for illustrative purposes only, and may be omitted in some embodiments.

The connector bars 132-138 may visually connect the display characteristic markers 112-118 and provide a quick reference for the user to assess the combination of display characteristics. For instance, in the illustrative example depicted in FIG. 1, the connector bars 132-138 form a quadrilateral, and the shape of the quadrilateral reflects the specific combination of the four display characteristics. A user familiar with their preferred display characteristics may be able to adjust the display to these preferred characteristics by manipulating the display characteristics to the preferred shape using the methods described herein.

The origin 140 may represent an intersection point of the display characteristic axes 102-108. In some embodiments, The origin 140 may also represent a value of 0 for one or more of the display characteristics.

The contact points 154 and 156 represent the positions on the touch screen that are contacted by fingers 150 and 152. Although only two fingers are depicted in the illustrative example of FIG. 1, it will be understood that any suitable number of fingers may contact the touch screen at the same time and may be utilized in the systems and methods described herein. In the illustrative example depicted in FIG. 1, the contact points 154 and 156 are denoted by star symbols. However, these symbols may be omitted in some embodiments.

Figure 2:
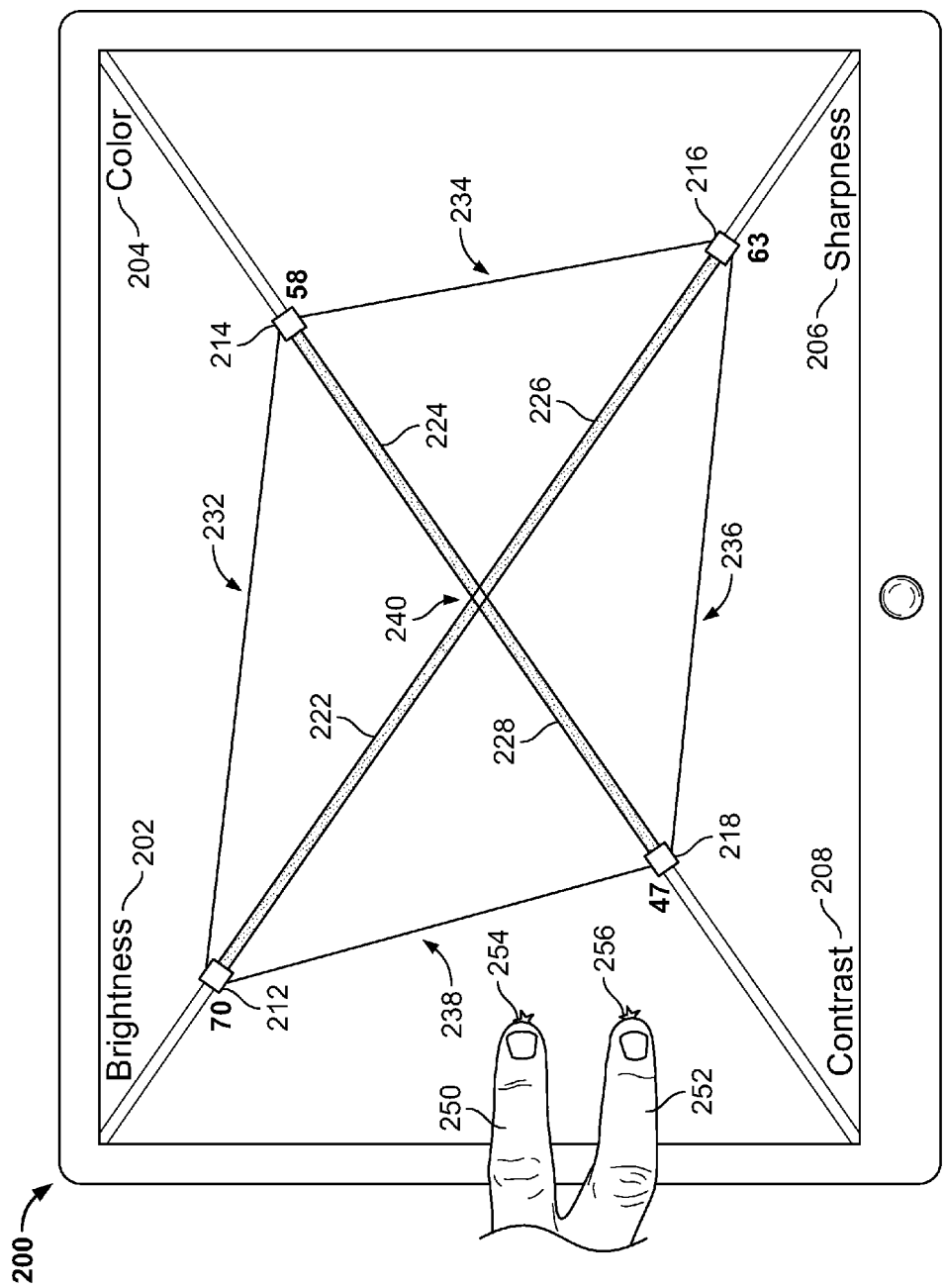
FIG. 2 shows another illustrative display screen for adjusting screen characteristics in accordance with some embodiments of the disclosure.

FIG. 2 shows another illustrative display screen 200 for adjusting screen characteristics in accordance with some embodiments of the disclosure. Display screen 200 includes display characteristic axes 202-208, display characteristic markers 212-218, display characteristic value bars 222-228, connector lines 232-238, origin 240, and contact points 254 and 256, which may be substantially similar to corresponding elements depicted in FIG. 1 and described above. Fingers 250 and 252 are shown for illustrative purposes only. It will be understood that the media recommendation screen 200 is provided for illustrative purposes only, that certain elements may be added or omitted, and that other configurations combinations of elements may be contemplated as will be understood by those of skill in the art.

In the illustrative example depicted in FIG. 2, a media asset is playing in the background while the display characteristic axes 202-208 are overlayed on top of the media asset. In this illustrative example, the display characteristic axes 202-208 comprise four diagonal lines extending from the origin 240, located at the center of the screen. As in the illustrative example depicted in FIG. 1, each axis corresponds to a single display characteristic. The value of each respective display characteristic is depicted as a numerical value between 0 and 100, and the current value of each respective display characteristic is indicated by a combination of the display characteristic markers 212-218 and display characteristic value bars 222-228. The display characteristic markers 212-218 are depicted as boxes, but it will be understood that any symbol or indicator may be utilized to indicate a position on the display characteristic axes 202-208. Furthermore, the illustrative example depicted in FIG. 2 depicts the current value of the respective display characteristic as a number beside the display characteristic marker 212-218. It will be understood that the display characteristic markers, numbers, and display characteristic bars 222-228 are provided for illustrative purposes only, and may be omitted in some embodiments.

The connector bars 232-238 may visually connect the display characteristic markers 212-218 and provide a quick reference for the user to assess the combination of display characteristics. For instance, in the illustrative example depicted in FIG. 2, the connector bars 232-238 form a quadrilateral, and the shape of the quadrilateral reflects the specific combination of the four display characteristics. A user familiar with their preferred display characteristics may be able to adjust the display to these preferred characteristics by manipulating the display characteristics to the preferred shape using the methods described herein.

The contact points 254 and 256 represent the positions on the touch screen that are contacted by fingers 250 and 252. Although only two fingers are depicted in the illustrative example of FIG. 2, it will be understood that any suitable number of fingers may contact the touch screen at the same time and may be utilized in the systems and methods described herein. In the illustrative example depicted in FIG. 2, the contact points 254 and 256 are denoted by star symbols. However, these symbols may be omitted in some embodiments.

Figure 3:
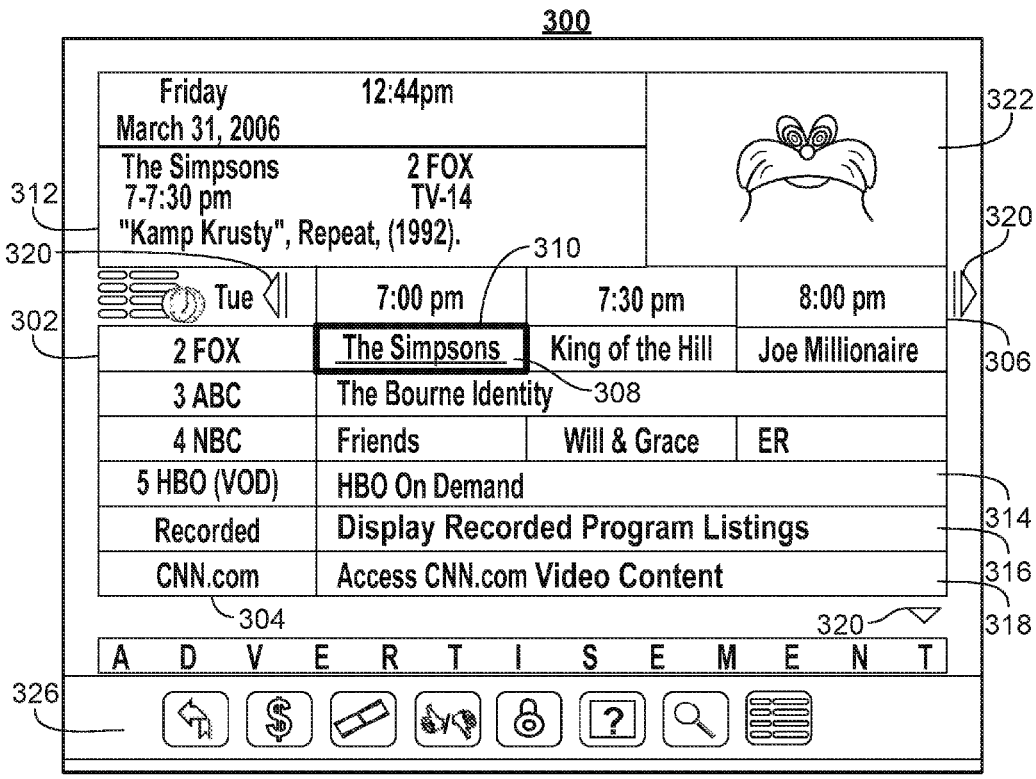
FIG. 3 shows an illustrative example of a display screen for use in accessing media content in accordance with some embodiments of the disclosure.
Figure 4:
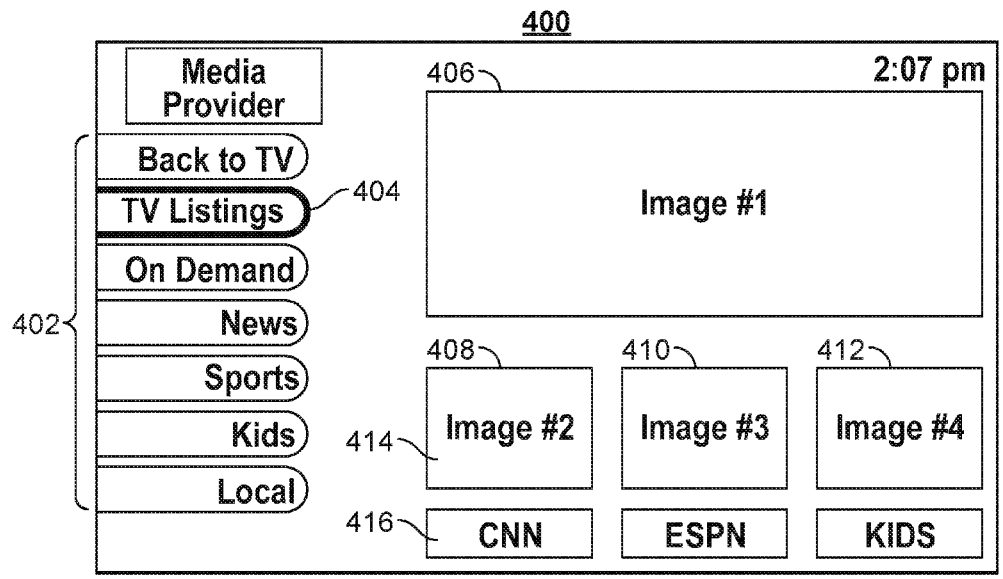
FIG. 4 shows another illustrative example of a display screen used to access media content in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
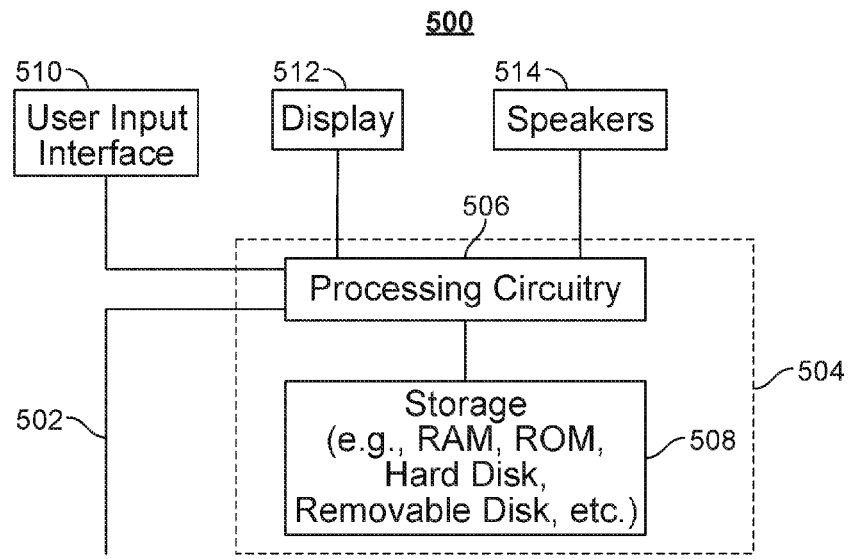
FIG. 5 is a block diagram of an illustrative user equipment device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
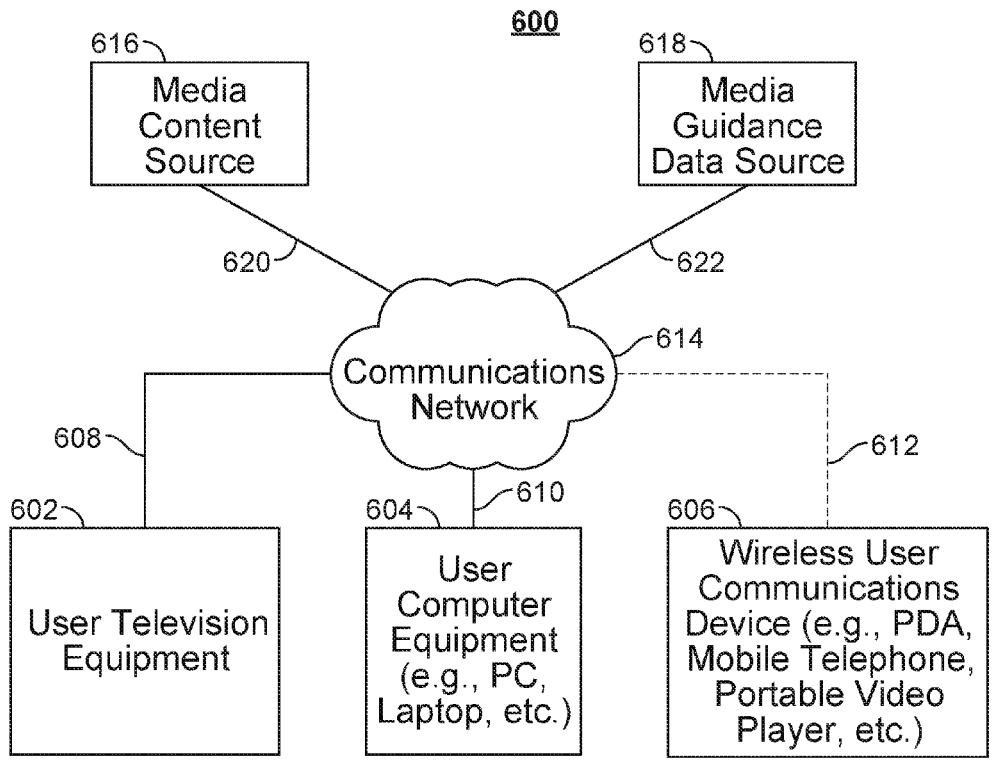
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
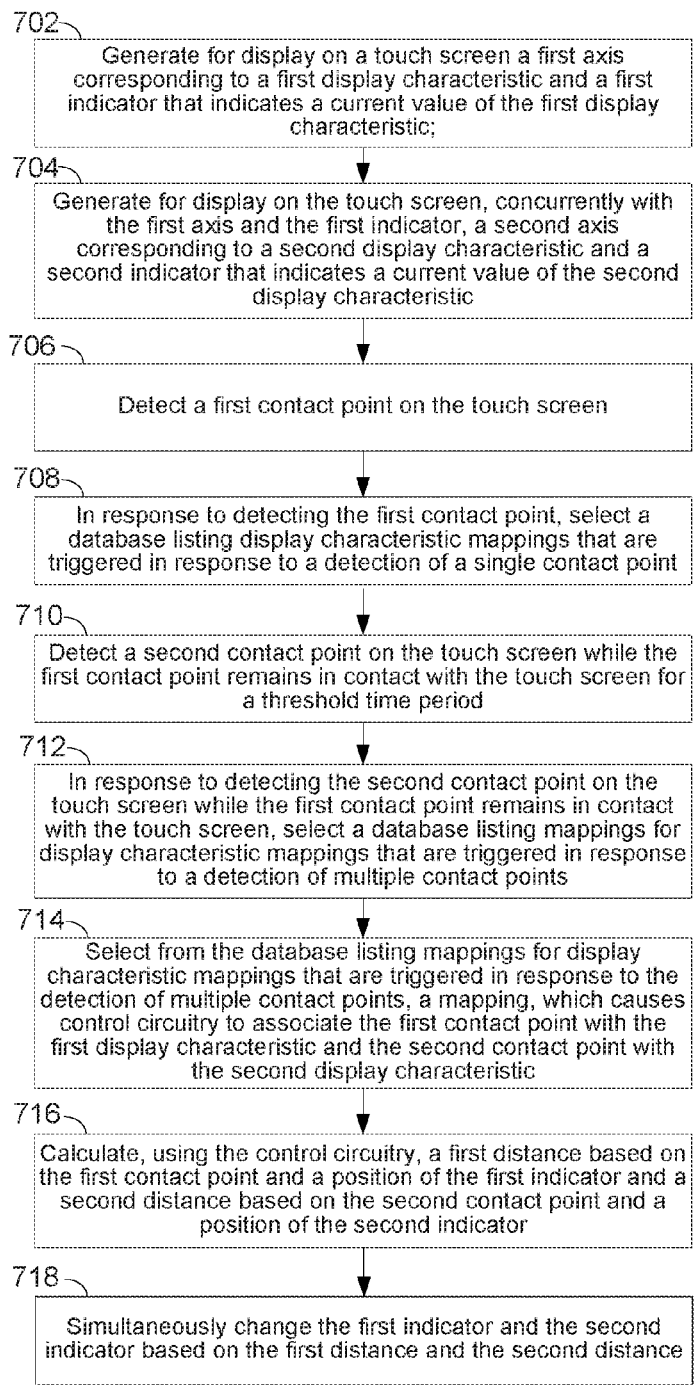
FIG. 7 is a flowchart of illustrative steps for adjusting screen characteristics in accordance with some embodiments of the disclosure.

FIG. 7 is a flowchart of illustrative steps 700 for adjusting screen characteristics in accordance with some embodiments of the disclosure. It should be noted that process 700, or any step thereof, could occur on, or be provided by, any of the devices shown in FIGS. 5-6. For example, process 700 may be executed by control circuitry 504 (FIG. 5) as instructed by the media guidance application (e.g., as implemented on any of the devices shown and described in FIG. 6).

At step 702, the media guidance application may generate for display (e.g., using control circuitry 504) on a touch screen (e.g., display 512) a first axis corresponding to a first display characteristic and a first indicator that indicates a current value of the first display characteristic. The first axis may be any suitable indicator for representing a range of values for a display characteristic. For example, the first axis may comprise a straight line, a curved line, a pie chart, or a numerical indicator. The first indicator may be any suitable indicator for indicating a current value for a display characteristic. For example, the first indicator may comprise a marker, symbol, or numerical indicator corresponding to the current value of the display characteristic. In some embodiments, the first indicator may be configured to be displayed or overlaid on top of the first axis. For example, as in the illustrative examples depicted in FIGS. 1 and 2, the first indicator may be overlaid onto the first axis at a position corresponding to the current value of the display characteristic relative to the full range of possible values. The first axis and the first indicator may be overlaid on a media asset, either paused or currently playing in the background.

At step 704, the media guidance application may generate for display (e.g., using control circuitry 504) on a touch screen (e.g., display 512), concurrently with the first axis and the first indicator, a second axis corresponding to a second display characteristic and a second indicator that indicates a current value of the second display characteristic. The second axis and the second indicator may be substantially similar to the first axis and the first indicator described above, except corresponding to a second display characteristic. For example, as in the illustrative examples depicted in FIGS. 1 and 2, a display may concurrently display indicators for multiple display characteristics, allowing the user to view and adjust two or more display characteristics simultaneously.

At step 706, the media guidance application may detect (e.g., using user input interface 510 and/or control circuitry 504) a first contact point on the touch screen. In some embodiments, the media guidance application may detect the first contact point by accessing an application programming interface (API) associated with the touch screen and retrieving metadata associated with the first contact point. The metadata associated with the first contact point may comprise any data that describes the first contact point, including, for example, a location (such as (x,y) coordinates on the touch screen), a surface area of the first contact point, and/or a touch pressure of the first contact point. In some embodiments, the API of the touch screen may also return one or more of the following: a timestamp associated with a start of contact, a timestamp associated with the removal of contact, and/or a duration of contact. For example, the API of the touch screen may register a "start event" at the time that contact is first detected on the touch screen. The API may register an "end event" at a time that contact is removed from the touch screen. The API may subtract a timestamp associated with the "end event" from a timestamp associated with the "start event" to determine a duration of the contact. The API may also register a "transition event" between the "start event" and the "end event." In some embodiments, the "transition event" may be registered in response to a movement or a swipe motion of the contact. The transition event may register any one of the following: a timestamp for the beginning of movement, a timestamp for the end of movement, a distance of the movement, a start and/or end point of the movement, a speed of the movement, and an acceleration of the movement.

At step 708, the media guidance application may, in response to detecting the first contact point, select a database listing display characteristic mappings that are triggered in response to a detection of a single contact point. The database may be stored locally (e.g., at storage 508) or remotely (e.g., at media guidance data source 618). The database may store one or more display characteristic mappings that may be retrieved by the media guidance application. As discussed above, the display characteristic mappings may comprise data that indicates a correlation between a user input and a display characteristic. As an illustrative example, the mapping may comprise data that causes the media guidance application to adjust a display characteristic in response to a certain button press on a user input device. As another example, the mapping may comprise data that causes the media guidance application to adjust a display characteristic in response to a single touch press or swipe event on a touch screen. The database and/or the mapping may be retrieved in advance, or in response to detecting a contact point. In some embodiments, particular data fields may be retrieved from the database and/or the mapping in response to detecting the contact point. For example, in response to detecting a swipe motion, the media guidance application may access data fields in the mapping that relate to one of a position, relative location, pressure, surface area, or other describing characteristics of a touch event, as well as a corresponding data field that indicates a particular display characteristic. The media guidance application may determine a match between characteristics of the detected contact point (e.g., position, relative location, surface area, pressure) and one or more of the retrieved data fields and assign a display characteristic to be controlled by the detected contact point. In this manner, the mapping may instruct the media guidance application to adjust a particular display characteristic in response to the first contact point.

At step 710, the media guidance application may detect (e.g., using user input interface 510 and/or control circuitry 504) a second contact point on the touch screen while the first contact point remains in contact with the touch screen for a threshold time. The media guidance application may detect the second contact point in a substantially similar way to detecting the first contact point. In some embodiments, the media guidance application may detect a "start event" associated with the second contact point from an API of the touch screen and determine whether an "end event" associated with the first contact point has been registered by the API. If the "end event" associated with the first contact point has not yet been registered by the API, then the media guidance application may conclude that the second contact point was detected while the first contact point is still in contact with the touch screen. In some embodiments, the media guidance application may compare a start time of the second contact point with an end time of the first contact point. If the start time of the second contact point is before the end time of the first contact point, then the media guidance application may conclude that the second contact point was received while the first contact point was in contact with the touch screen. In some embodiments, the media guidance application may compare the time difference to a threshold time period, and only register multiple simultaneous touches if the time difference exceeds a threshold time.

At step 712, the media guidance application may, in response to detecting the second contact point on the touch screen while the first contact point remains in contact with the touch screen, select a database listing mappings for display characteristic mappings that are triggered in response to a detection of multiple contact points. The database listing mappings for display characteristic mappings that are triggered in response to a detection of multiple contact points may be the same database or substantially similar to the database listing mappings for display characteristic mappings that are triggered in response to a detection of a single contact point selected in step 708. In some embodiments, the database listing mappings for display characteristic mappings that are triggered in response to a detection of multiple contact points may be different than the database listing mappings for display characteristic mappings that are triggered in response to a detection of a single contact point selected in step 708. In some embodiments, the two databases may be stored in different locations. For example, the database listing mappings for display characteristic mappings that are triggered in response to a detection of multiple contact points may be stored in local storage (e.g., storage 508), while the database listing mappings for display characteristic mappings that are triggered in response to a detection of a single contact point may be stored in remote storage (e.g., media guidance data source 618), or vice versa.

At step 714, the media guidance application may select (e.g., using control circuitry 504) from the database listings mappings for display characteristic mappings that are triggered in response to the detection of multiple contact points, a mapping, which causes the control circuitry 504 to associate the first contact point with the first display characteristic and the second contact point with the second display characteristic. For example, the mapping may comprise data that causes the media guidance application to distinguish between multiple simultaneous touch or swipe events and assign a first contact point or swipe event to adjust a first display characteristic and a second contact point or swipe event to adjust a second display characteristic. As an illustrative example, a user may touch a touch screen with the tips of two fingers. The media guidance application may access a mapping of display characteristics which indicates that, in the case of two touch points, the left-most touch point is to be assigned to controlling brightness and the right-most touch point is to be assigned to controlling contrast.

At step 716, the media guidance application may calculate (e.g., using control circuitry 504), a first distance based on the first contact point and a position of the first indicator and a second distance based on the second contact point and a position of the second indicator. For example, the media guidance application may calculate a first distance between the first contact point and the first axis and a second distance between the second contact point and the second axis. The media guidance application may determine, based on the calculated first distance and the calculated second distance, that the first contact point is closer to the first axis than the second contact point. In some embodiments, the media guidance application may extrapolate a line between the first contact point and the first axis and determine an intersection point between the extrapolated line and the first axis. The media guidance application may then calculate a distance between the intersection point and the position of the first indicator in order to determine an amount to adjust the first display characteristic. In some embodiments, the media guidance application may detect a swipe motion of either one or both of the first contact point or the second contact point. The media guidance application may determine the first distance as the distance of the swipe of the first contact point, and/or the second distance as the distance of the swipe of the second contact point.

At step 718, the media guidance application may simultaneously change (e.g., using control circuitry 504) the first indicator and the second indicator based on the first distance and the second distance. For example, the media guidance application may detect that the first contact point is on the first axis, and that the distance between the first contact point and the first indicator is the first distance. The media guidance application may adjust the value of the first display characteristic to a value corresponding to the position of the first contact point on the first axis, and update the position of the first indicator to the position of the first contact point. The media guidance application may make a similar adjustment based on the second contact point. In some embodiments, the media guidance application may detect that the first contact point is not on the first axis. In such embodiments, the media guidance application may extrapolate a line (e.g., either horizontal, vertical, or perpendicular to the first axis), from the first contact point to the first axis. The media guidance application may adjust the value of the first display characteristic to a value corresponding to the position of the intersection point of the line and the first axis, and update the position of the first indicator to the intersection point. For example, in the illustrative example depicted in FIG. 1, if the user presses an index finger at contact point 154, then the media guidance application may extract the y-coordinate of the contact point 154, extrapolate a horizontal line to the −y axis, corresponding to "sharpness," and adjust the sharpness value to the value corresponding to the y-coordinate of the contact point 154. The media guidance application may make a similar adjustment based on the second contact point. In some embodiments, the media guidance application may detect a swipe motion of one or both of the first contact point and the second contact point and adjust the first and/or second display characteristic according to a distance, speed, and/or acceleration of the swipe motion.

FIG. 8 depicts illustrative pseudocode 800 for adjusting screen characteristics in accordance with some embodiments of the disclosure. It will be evident to one skilled in the art that the process described by the pseudocode in FIG. 8 may be implemented in any number of programming languages and a variety of different hardware, and that the style and format should not be construed as limiting, but rather a general template of the steps and procedures that would be consistent with code used to implement some embodiments of this disclosure.

At line 801, control circuitry 504 runs a subroutine to initialize variables and prepare to adjust display characteristics, which begins at line 803. For example, control circuitry 504 may copy instructions from non-transitory storage medium (e.g., storage 508) in to RAM or into a cache for processing circuitry 506 during the initialization stage.

At line 804, control circuitry 504 generates for display on a touch screen a first axis corresponding to a first display characteristic. As discussed above, the first axis may be any suitable indicator for representing a range of values for a display characteristic. At line 805, control circuitry 504 may retrieve (e.g., from storage 508) a variable A which represents a current value of a first display characteristic. At line 806, the control circuitry 504 may generate for display a first indicator on the first axis at coordinates (x1, y1) based on the value of variable A. As an illustrative example, the first axis may be generated as the +x axis in a Cartesian coordinate system. The Cartesian coordinate system may be centered on the screen, with a point at (x,y) values of (0,0) representing a point at the center of the screen, and a point at (100,100) representing the upper right corner. In such embodiments, the control circuitry 504 may generate the first indicator at the point (0,A). In some embodiments, the value of the first display characteristic and the scale of the first axis may not match. For example, the first display characteristic may range from values 0 to 100, while the scale of the first axis may range from 0 to 1000. In such embodiments, the first indicator may be display at (x,y) coordinates: (0, A*(max_first_axis/max_first_display)), where the variable max_first_axis represents the maximum value of the scale of the first axis (which is 1000 in this illustrative example), and the variable max_first_display equals the maximum value of the first display characteristic.

At line 807, control circuitry 504 may generate for display on the touch screen a second axis corresponding to the second display characteristic. At line 808, control circuitry 504 may retrieve variable B representing the current value of a second display characteristic. At line 809, the control circuitry 504 may generate for display a second indicator on the second axis at (x2, y2) based on the value of variable B. The lines 807-809 may be substantially similar to lines 804-806 describes above in relation to the first display characteristic, except performed in relation to a second display characteristic.

At line 810, the control circuitry 504 may detect a first contact point on the touch screen. The control circuitry 504 may utilize any suitable interface and/or sensors to detect the first contact point. In some embodiments, the control circuitry 504 may be directly connected to touch sensors of the touch screen and receive signals from the touch sensors when the touch sensors detect contact on the touch screen. In some embodiments, the control circuitry 504 may interface with a touch interface of the touch screen and receive indications of touch events from the touch interface. For example, the control circuitry 504 may receive indications from an API of the touch interface corresponding to touch events detecting on the touch screen.

At line 811, the control circuitry may select a database listing display characteristic mappings for a single contact point. The database may be stored locally (e.g., at storage 508) or remotely (e.g., at media guidance data source 618). The database may store one or more display characteristic mappings that may be retrieved by the control circuitry 504. As discussed above, the display characteristic mappings may comprise data that indicates a correlation between a user input and a display characteristic. As an illustrative example, the mapping may comprise data that causes the control circuitry 504 to adjust a display characteristic in response to a certain button press on a user input device. As another example, the mapping may comprise data that causes the control circuitry 504 to adjust a display characteristic in response to a single touch press or swipe event on a touch screen.

At line 812, the control circuitry 504 may detect a second contact point on the touch screen in substantially the same way that it detected the first contact point at line 810. In some embodiments, the control circuitry 504 may determine whether the second contact point was registered while the first contact point was in contact with the touch screen and/or within a threshold time of the first contact point. At line 813, the control circuitry 504 may select a database listing mappings for display characteristic mappings that are triggered in response to a detection of multiple contact points. The database listing mappings for display characteristic mappings that are triggered in response to a detection of multiple contact points may be the same database or substantially similar to the database listing mappings for display characteristic mappings that are triggered in response to a detection of a single contact point selected. In some embodiments, the database listing mappings for display characteristic mappings that are triggered in response to a detection of multiple contact points may be different than the database listing mappings for display characteristic mappings that are triggered in response to a detection of a single contact point selected. In some embodiments, the two databases may be stored in different locations. For example, the database listing mappings for display characteristic mappings that are triggered in response to a detection of multiple contact points may be stored in local storage (e.g., storage 508), while the database listing mappings for display characteristic mappings that are triggered in response to a detection of a single contact point may be stored in remote storage (e.g., media guidance data source 618), or vice versa.

At line 814, the control circuitry 504 may access a mapping from the selected database that associates the first contact point with the first display characteristic and the second contact point with the second display characteristic. As discussed above, this association may be performed in several different ways. For example, the mapping may indicate that the first and second contact points are to be associated with display characteristics based on their relative positions to each other, their positions on the touch screen, their positions on the touch screen relative to the first and second axes, their relative surface areas, or their associated touch pressures, among other methods. At line 815, the control circuitry 504 may retrieve coordinates (x3, y3) associated with the first contact point, and at line 816, the control circuitry 504 may retrieve coordinates (x4, y4) associated with the second contact point. The control circuitry 504 may receive these coordinates, for example, from a touch interface or an API associated with the touch screen. In some embodiments, the control circuitry 504 may retrieve the coordinates from RAM or similar volatile storage that is shared between the touch interface or an API of the touch screen and the control circuitry 504.

At line 817, the control circuitry 504 may calculate a first distance based on (x1, y1) and (x3, y3), and at line 818, the control circuitry 504 may calculate a second distance based on (x2, y2) and (x4, y4). As discussed above in relation to step 716, the first and second distance may be calculated in a number of different ways. For example, the control circuitry 504 may calculate a first distance between the first contact point and the first axis and a second distance between the second contact point and the second axis. The control circuitry 504 may determine, based on the calculated first distance and the calculated second distance, that the first contact point is closer to the first axis than the second contact point. In some embodiments, the control circuitry 504 may extrapolate a line between the first contact point and the first axis and determine an intersection point between the extrapolated line and the first axis. The control circuitry 504 may then calculate a distance between the intersection point and the position of the first indicator in order to determine an amount to adjust the first display characteristic. In some embodiments, the control circuitry 504 may detect a swipe motion of either one or both of the first contact point or the second contact point. The media guidance application may determine the first distance as the distance of the swipe of the first contact point, and/or the second distance as the distance of the swipe of the second contact point.

At line 819, the control circuitry 504 may calculate a new position (x1', y1') of the first indicator based on the first distance, and at line 820, the control circuitry 504 may calculate a new position (x2', y2') of the second indicator based on the second distance. As discussed above in relation to step 718, the first and second indicator may be adjusted to their new positions in a number of different ways. In some embodiments, the control circuitry 504 may adjust the first and second indicator based on the static positions of the first and second contact points. For instance, if the user contacts points on the first and second axes, then the first and second indicators may be adjusted to the positions of the contact points on the respective axes. In some embodiments, the user may swipe one or both contact points, and the control circuitry 504 may calculate the first and/or second distances based on the distance of the swipe motions. The control circuitry 504 may then adjust the first and/or the second indicator based on the first and/or second distance, speed of the swipe motion(s), and/or the acceleration of the swipe motion(s). At line 821, the control circuitry 504 may generate for display the first and second indicators at their new calculated positions.

At line 823, control circuitry 504 runs a termination subroutine after the algorithm has performed its function. For example, in some embodiments, the control circuitry 504 may destruct variables, perform garbage collection, free memory, or clear the cache of processing circuitry 506.

It will be evident to one skilled in the art that process 800 described by the pseudocode in FIG. 8 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions may be placed throughout to speed operation, or the conditional statements may be replaced with a case-switch. In some embodiments, rather than iterating over all instances of a variable, in some embodiments the code may be rewritten so control circuitry 504 is instructed to evaluate multiple instances simultaneously on a plurality of processors or processor threads, lowering the number of iterations needed and potentially speeding up computation time.

Figure 9:
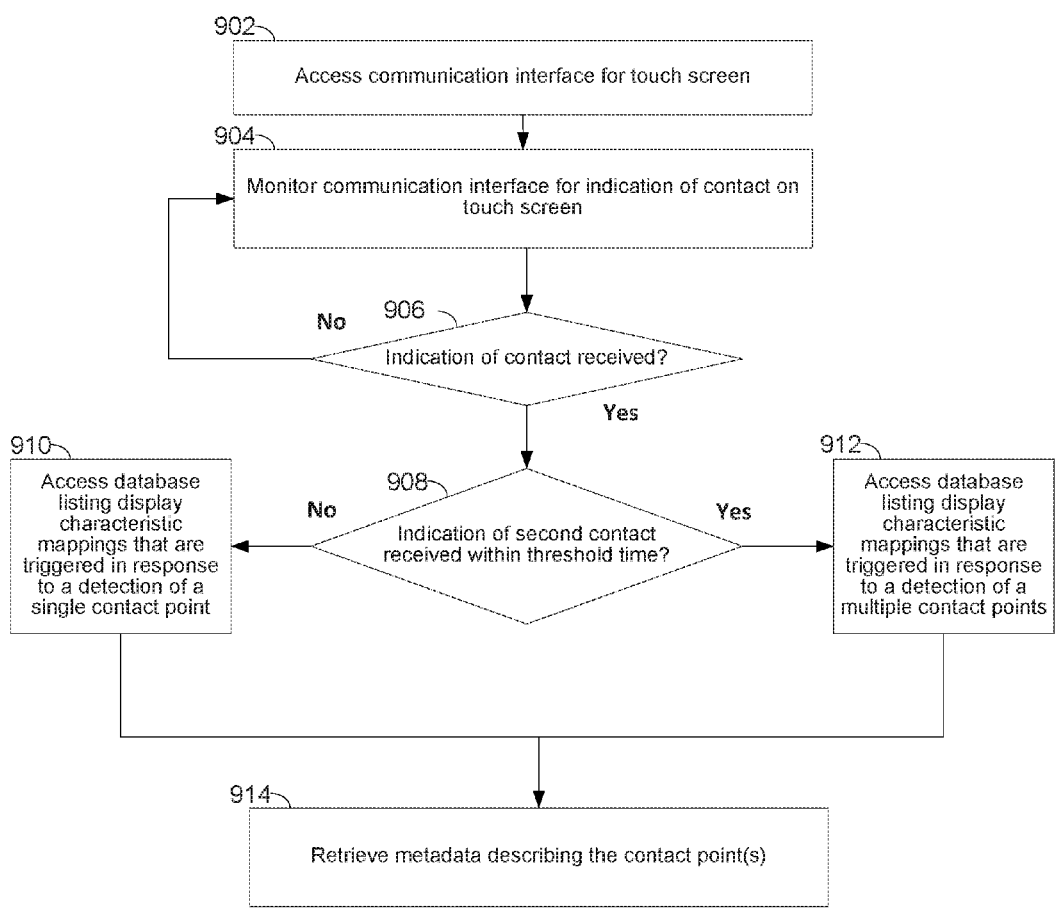
FIG. 9 is a flowchart of illustrative steps for processing touch events on a touch screen in accordance with some embodiments of the disclosure.

FIG. 9 is a flowchart 900 of illustrative steps for processing touch events on a touch screen in accordance with some embodiments of the disclosure. It should be noted that process 900, or any step thereof, could occur on, or be provided by, any of the devices shown in FIGS. 5-6. For example, process 900 may be executed by control circuitry 504 (FIG. 5) as instructed by the media guidance application (e.g., as implemented on any of the devices shown and described in FIG. 6).

At step 902, the media guidance application may access (e.g., using control circuitry 504) a communication interface for a touch screen. In some embodiments, the communication interface may comprise a hardware interface, such as a direct hardware connection to touch sensors embedded in the touch screen. In such embodiments, the media guidance application may be configured to receive and interpret raw data signals from the touch sensors. In some embodiments, the communication interface may comprise a software interface, such as an API associated with the touch screen. In such embodiments, the API may interpret the raw data signals from the touch sensors and register touch events. The API may send indications of the touch events to the media guidance application in response to the touch events.

At step 904, the media guidance application may monitor (e.g., using control circuitry 504) the communication interface for an indication of contact on the touch screen. At step 906, if the indication of contact has not yet been received, then the media guidance application may loop back to step 904. If contact is detected, the media guidance application may continue to step 908 and determine (e.g., using control circuitry 504) whether an indication of second contact is received within a threshold time. In some embodiments, the media guidance application may compare (e.g., using control circuitry 504) a timestamp associated with a beginning of the first contact point to a timestamp associated with a beginning of the second contact point. If the second contact point was received within a threshold time of the beginning of the first contact point, or if the second contact point was received before the end time of the first contact point, then the media guidance system may register multiple simultaneous touches and proceed to step 912. If the indication of second contact is not received, or is not received within the threshold time, then the media guidance application may register separate single touch events, and continue to step 910. The threshold time period may be set by a system programmer or administrator, or may be set and/or adjusted manually by a user.

At step 910, the media guidance application may access (e.g., using control circuitry 504) a database listing display characteristic mappings that are triggered in response to a detection of a single contact point. The database in step 910 may be substantially similar to the database in step 708.

At step 912, the media guidance application may access (e.g., using control circuitry 504) a database listing display characteristic mappings that are triggered in response to a detection of multiple contact points. The database in step 912 may be substantially similar to the database in step 712.

At step 914, the media guidance application may retrieve (e.g., using control circuitry 504) metadata describing the contact point or points. As described above, the metadata describing the contact points may comprise any suitable information about the contact points, including, for example, a location (such as (x,y) coordinates on the touch screen), a surface area of the first contact point, and/or a touch pressure of the first contact point. The metadata may be received from the communication interface, or it may be retrieved from storage, such as storage 508 or from volatile storage, such as RAM shared by the control circuitry 504 and the touch interface.

Figure 10:
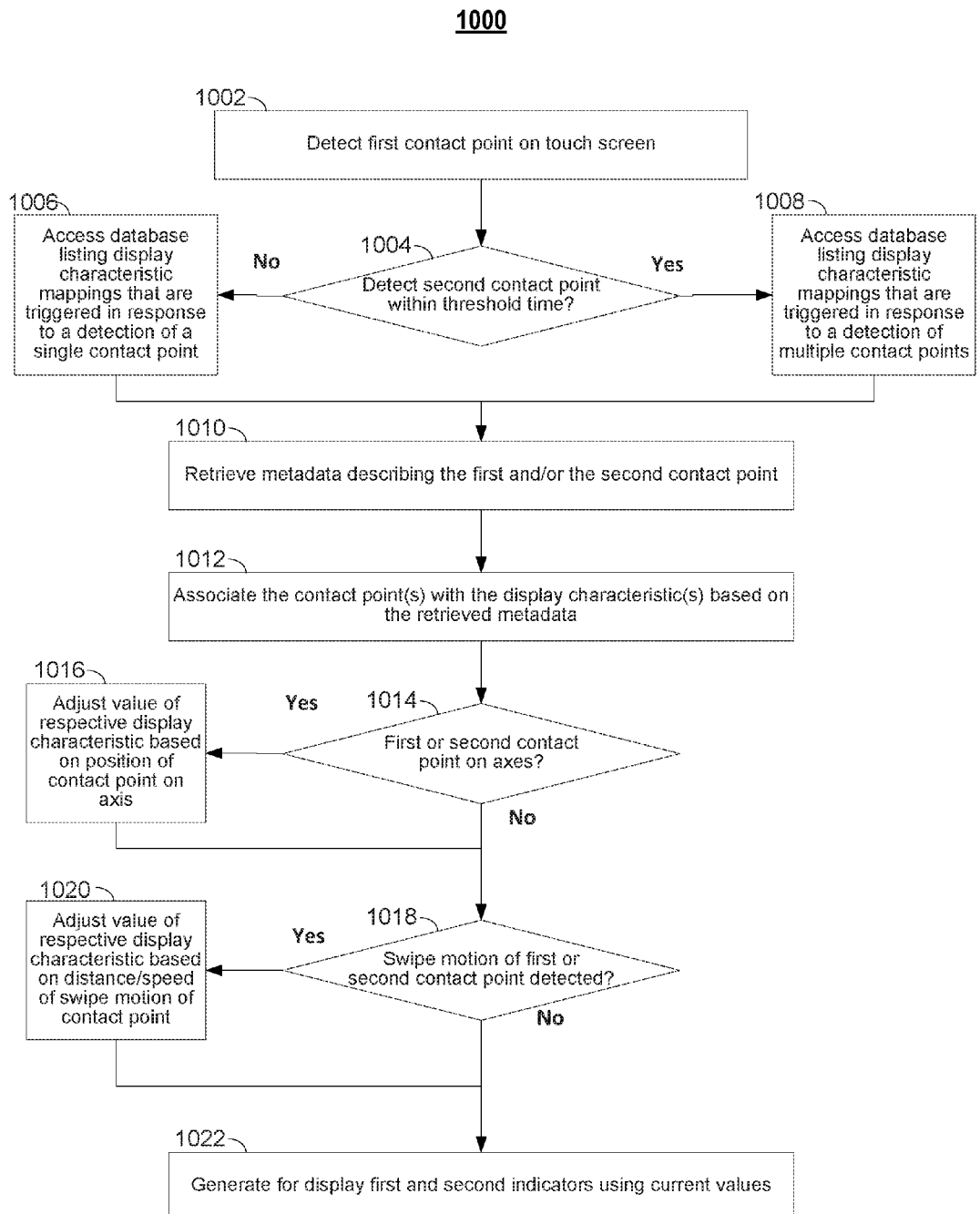
FIG. 10 is a flowchart of illustrative steps for adjusting screen characteristics in accordance with some embodiments of the disclosure.

FIG. 10 is a flowchart 1000 of illustrative steps for adjusting screen characteristics in accordance with some embodiments of the disclosure. It should be noted that process 1000, or any step thereof, could occur on, or be provided by, any of the devices shown in FIGS. 5-6. For example, process 1000 may be executed by control circuitry 504 (FIG. 5) as instructed by the media guidance application (e.g., as implemented on any of the devices shown and described in FIG. 6).

At step 1002, the media guidance application may detect (e.g., using user input interface 510 and/or control circuitry 504) a first contact point on the touch screen. Step 1002 may be substantially similar to step 706 described above in relation to FIG. 7. At step 1004, the media guidance application may detect (e.g., using control circuitry 504) whether a second contact point is detected within a threshold time. For example, the media guidance application may compare a timestamp associated with the beginning of the first contact point and a timestamp associated with the beginning of the second contact point to determine whether the time difference of the two timestamps is within a threshold time. If the second contact point is detected within a threshold time of the first contact point, the media guidance application may proceed to step 1008 and access a database listing display characteristic mappings that are triggered in response to a detection of multiple contact points. If the second contact point is not detected within a threshold time of the first contact point, the media guidance application may proceed to step 1006 and access a database listing display characteristic mappings that are triggered in response to a detection of a single contact point. Steps 1006 and 1008 may be substantially similar to steps 910 and 912 described above in relation with FIG. 9.

At step 1010, the media guidance application may retrieve (e.g., using control circuitry 504 from storage 508) metadata describing the first and/or the second contact point. As discussed above, the metadata may comprise any suitable information related to the first and/or second contact point, including, for example, a location (such as (x,y) coordinates on the touch screen), a surface area of the first contact point, and/or a touch pressure of the first contact point. At step 1012, the media guidance application may associate (e.g., using control circuitry 504) the contact point(s) with the display characteristic(s) based on the retrieved metadata. If the media guidance application detected only a single contact point, then the media guidance application may retrieve the database at step 1006 and, based on a mapping stored in the database, associate the single contact point to control one of a plurality of display characteristics. As an illustrative example, the media guidance application may associate the single contact point to controlling a display characteristic associated with the closest axis to the contact point. As another illustrative example, the media guidance application may associate the single contact point to controlling brightness if a touch pressure associated with the single contact point is less than a threshold pressure, and to controlling contrast if the touch pressure is greater than the threshold pressure. If the media guidance application detected multiple contact points at step 1004, the media guidance application may retrieve the database at step 1008 and, based on a mapping stored in the database, associate each of the multiple contact points to one of a plurality of display characteristics. The media guidance application may first distinguish the two contact points based on the retrieved metadata from step 1010. For example, the media guidance application may, based on the retrieved metadata, order the multiple contact points from a left-most contact point to a right-most contact point based on location of the contact points on the touch screen. As another example, the media guidance application may rank the multiple contact points based on surface area or respective touch pressure of the contact points. The mapping may associate the plurality of display characteristics to the ordered or ranked multiple contact points. For example, the mapping may comprise data that assigns the contact points from the highest to the lowest touch pressure respectively to brightness, contrast, sharpness, and color balance. In this manner, each touch input from a user may be assigned to controlling a single display characteristic, and the user may manipulate each touch input as desired to achieve the preferred combination of display characteristics.

At step 1014 the media guidance application may determine (e.g., using control circuitry 504) whether the first or second contact point is on one of the first or second axis. A touch input on one of the axes may indicate a user's desire to move the value of the respective display characteristic to the touched position on the axis. If the media guidance application determines that one of the first or second contact points is on one of the first or second axis, then the media guidance application may continue to step 1016 and adjust the value of the respective display characteristic based on the position of the contact point on the axis. Otherwise, the media guidance application will continue to step 1018 and determine whether a swipe motion of either the first contact point or the second contact point is detected. If a swipe motion is detected, then the media guidance application may, at step 1020, adjust the value of the respective display characteristic based on a distance, speed, or acceleration of the swipe motion. At step 1022, the media guidance application may generate for display the first and second indicators using the current or adjusted values.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for adjusting display characteristics of a display device, the method comprising:
   generating for display on a touch screen a first axis corresponding to a first display characteristic and a first indicator that indicates a current value of the first display characteristic;
   generating for display on the touch screen, concurrently with the first axis and the first indicator, a second axis corresponding to a second display characteristic that is different from the first display characteristic, and a second indicator that indicates a current value of the second display characteristic;
   detecting a first contact point on the touch screen;
   in response to detecting the first contact point, selecting a database listing display characteristic mappings that are triggered in response to a detection of a single contact point;
   detecting a second contact point on the touch screen while the first contact point remains in contact with the touch screen for a threshold time period;
   in response to detecting the second contact point on the touch screen while the first contact point remains in contact with the touch screen, selecting a database listing mappings for display characteristic mappings that are triggered in response to a detection of multiple contact points;
   selecting from the database listing mappings for display characteristic mappings that are triggered in response to the detection of multiple contact points, a mapping, which causes control circuitry to associate the first contact point with the first display characteristic and the second contact point with the second display characteristic;
   calculating, using the control circuitry, a first distance based on the first contact point and a position of the first indicator and a second distance based on the second contact point and a position of the second indicator; and
   simultaneously changing the first indicator by a first amount based on the first distance and the second indicator by a second amount based on the second distance, wherein the first amount is independent from the second amount.

2. The method of claim 1, further comprising determining a distance between the first contact point and the second contact point on the touchscreen, and wherein the mapping is selected from the database listing mappings for display characteristic mappings that are triggered in response to the detection of multiple contact points based on the distance between the first contact point and the second contact point on the touchscreen.

3. The method of claim 1, further comprising determining a pressure differential between a pressure at the first contact point and a pressure at the second contact point on the touchscreen, and wherein the mapping is selected from the database listing mappings for display characteristic mappings that are triggered in response to the detection of multiple contact points based on the pressure differential.

4. The method of claim 1, further comprising determining a length of time of contact at the first contact point and a length of time of contact at the second contact point on the touchscreen, and wherein the mapping is selected from the database listing mappings for display characteristic mappings that are triggered in response to the detection of multiple contact points based on the length of time of contact at the first contact point and the length of time of contact at the second contact point.

5. The method of claim 1, further comprising determining a difference in a surface area of contact at the first contact point and a surface area of contact at the second contact point on the touchscreen, and wherein the mapping is selected from the database listing mappings for display characteristic mappings that are triggered in response to the detection of multiple contact points based on the difference in the surface area of contact at the first contact point and the surface area of contact at the second contact point on the touchscreen.

6. The method of claim 1, wherein calculating the first distance and the second distance comprises:
  calculating a distance between the first contact point and the first axis; and
  calculating a distance between the second contact point and the first axis; and further comprising:
  determining, based on the calculated first distance and the calculated second distance, that the first contact point is closer to the first axis than the second contact point; and
  wherein the mapping causes the control circuitry to associate the first contact point with the first display characteristic and the second contact point with the second display characteristic based on the determination that the first contact point is closer to the first axis than the second contact point.

7. The method of claim 1, wherein the first contact point is on the first axis, and wherein the second contact point is on the second axis.

8. The method of claim 1, wherein calculating the first distance comprises:
  extrapolating a line between the first contact point and the first axis;
  determining an intersection point between the extrapolated line and the first axis; and
  calculating a distance between the intersection point and the position of the first indicator.

9. The method of claim 1, wherein the first axis and second axis are generated for display on the touch screen by overlaying the first axis and the second axis on a media asset.

10. The method of claim 1, wherein the first display characteristic and the second display characteristic comprise one of the following: brightness, sharpness, contrast, color, and gamma correction.

11. A system for adjusting display characteristics of a display device, the system comprising:
  control circuitry configured to:
    generate for display on a touch screen a first axis corresponding to a first display characteristic and a first indicator that indicates a current value of the first display characteristic;
    generate for display on the touch screen, concurrently with the first axis and the first indicator, a second axis corresponding to a second display characteristic that is different from the first display characteristic, and a second indicator that indicates a current value of the second display characteristic;
    detect a first contact point on the touch screen;
    in response to detecting the first contact point, select a database listing display characteristic mappings that are triggered in response to a detection of a single contact point;
    detect a second contact point on the touch screen while the first contact point remains in contact with the touch screen for a threshold time period;
    in response to detecting the second contact point on the touch screen while the first contact point remains in contact with the touch screen, select a database listing mappings for display characteristic mappings that are triggered in response to a detection of multiple contact points;
    select from the database listing mappings for display characteristic mappings that are triggered in response to the detection of multiple contact points, a mapping, which causes the control circuitry to associate the first contact point with the first display characteristic and the second contact point with the second display characteristic;
    calculate a first distance based on the first contact point and a position of the first indicator and a second distance based on the second contact point and a position of the second indicator; and
    simultaneously change the first indicator by a first amount based on the first distance and the second indicator by a second amount based on the second distance, wherein the first amount is independent from the second amount.

12. The system of claim 11, wherein the control circuitry is further configured to determine a distance between the first contact point and the second contact point on the touchscreen, and wherein the mapping is selected from the database listing mappings for display characteristic mappings that are triggered in response to the detection of multiple contact points based on the distance between the first contact point and the second contact point on the touchscreen.

13. The system of claim 11, wherein the control circuitry is further configured to determine a pressure differential between a pressure at the first contact point and a pressure at the second contact point on the touchscreen, and wherein the mapping is selected from the database listing mappings for display characteristic mappings that are triggered in response to the detection of multiple contact points based on the pressure differential.

14. The system of claim 11, wherein the control circuitry is further configured to determine a length of time of contact at the first contact point and a length of time of contact at the second contact point on the touchscreen, and wherein the mapping is selected from the database listing mappings for display characteristic mappings that are triggered in response to the detection of multiple contact points based on the length of time of contact at the first contact point and the length of time of contact at the second contact point.

15. The system of claim 11, wherein the control circuitry is further configured to determine a difference in a surface area of contact at the first contact point and a surface area of contact at the second contact point on the touchscreen, and wherein the mapping is selected from the database listing mappings for display characteristic mappings that are triggered in response to the detection of multiple contact points based on the difference in the surface area of contact at the first contact point and the surface area of contact at the second contact point on the touchscreen.

16. The system of claim 11, wherein the control circuitry is configured to calculate the first distance and the second distance by:
  calculating a distance between the first contact point and the first axis; and calculating a distance between the second contact point and the first axis; and further comprising:

determining, based on the calculated first distance and the calculated second distance, that the first contact point is closer to the first axis than the second contact point; and wherein the mapping causes the control circuitry to associate the first contact point with the first display characteristic and the second contact point with the second display characteristic based on the determination that the first contact point is closer to the first axis than the second contact point.

17. The system of claim 11, wherein the first contact point is on the first axis, and wherein the second contact point is on the second axis.

18. The system of claim 11, wherein the control circuitry is configured to calculate the first distance by:

extrapolating a line between the first contact point and the first axis;

determining an intersection point between the extrapolated line and the first axis; and calculating a distance between the intersection point and the position of the first indicator.

19. The system of claim 11, wherein the first axis and second axis are generated for display on the touch screen by overlaying the first axis and the second axis on a media asset.

20. The system of claim 11, wherein the first display characteristic and the second display characteristic comprise one of the following: brightness, sharpness, contrast, color, and gamma correction.

* * * * *